United States Patent

Tsay

[11] Patent Number: 5,903,645
[45] Date of Patent: May 11, 1999

[54] CLAMPING DEVICE FOR MOBILE PHONES

[76] Inventor: Wen-Feng Tsay, P.O. Box 24-108, Taipei, Taiwan

[21] Appl. No.: 08/964,684

[22] Filed: Nov. 5, 1997

[51] Int. Cl.$^6$ ................................................ A47G 1/24
[52] U.S. Cl. ................................... 379/455; 248/316.4
[58] Field of Search .......................... 248/176.1, 309.1, 248/316.1, 316.4; 379/454, 455

[56] References Cited

U.S. PATENT DOCUMENTS

| | | | |
|---|---|---|---|
| 5,305,381 | 4/1994 | Wang et al. | 379/455 |
| 5,414,770 | 5/1995 | Wang | 379/454 |
| 5,457,745 | 10/1995 | Wang | 379/454 |
| 5,471,530 | 11/1995 | Chen | 379/454 |
| 5,555,302 | 9/1996 | Wang | 379/454 |
| 5,615,258 | 3/1997 | Ho | 379/454 |
| 5,694,468 | 12/1997 | Hsu | 379/454 |

*Primary Examiner*—Ramon O. Ramirez
*Assistant Examiner*—Robert Lipcsik
*Attorney, Agent, or Firm*—Dougherty & Troxell

[57] ABSTRACT

A clamping device for mobile phones includes a fork-shaped link pivotally connected to a clamp seat at either end. Each clamp seat has a lateral side provided with slanting rack teeth. An elastic securing seat is disposed adjacent to the rack teeth and has stop elements for projecting into the rack teeth to force the clamp seats to displace only inwardly to be positioned in place. The securing seat further has slanting notches at its ends. A press rod provided with corresponding slanting notches is passed through the notches of the securing seat. By pressing the press rod, the securing seat is urged to displace rearwardly, bring the stop elements to disengage from the rack teeth. Due to the action of compression springs, the clamp seats are caused to instantly extend to clamp mobile phones of various sizes and types.

2 Claims, 4 Drawing Sheets

CLAMPING DEVICE FOR MOBILE PHONES

BACKGROUND OF THE INVENTION (a) Field of the Invention

The present invention relates generally to a clamping device for mobile phones, and more particularly to a clamping device which is adjustable to permit easy and convenient clamping for mobile phones.

(b) Description of the Prior Art

Mobile phones have become very popular today. The placement of the mobile phones may however pose a problem in driving. It will be inconvenient to use the mobile phone if the mobile phone is hung from the driver's waist or placed in the handbag or briefcase. If it is randomly placed on the seat, the mobile phone may bump against hard objects, damaging the components. Therefore, there have been developed mobile phone holders for mounting in cars. As earlier types of such holders were mostly box type devices, they could hold mobile phones of a compatible size only. Besides, they could not effectively hold the mobile phones firmly in place and prevent them from bumping against or moving about inside the boxes. Although clamping devices were later provided in mobile phone holders for use in cars, their clamping effect was not satisfactory and it is inconvenient to remove or place the mobile phones from or on the holder. Besides, there are other disadvantages such as complicated construction, high costs, and low compatibility.

SUMMARY OF THE INVENTION

According to a first aspect of the invention, the clamping device comprises clamping means which permit synchronous action and instant clamping to facilitate firm clamping of a mobile phone on a base, and the clamping means may be caused to automatically open to facilitate removal of the phone from the base.

According to a second aspect of the invention, a fork-shaped link is provided to pivotally connect to a clamp seat at either end. Each clamp seat has a lateral side provided with slanting rack teeth. An elastic securing seat is disposed adjacent to the rack teeth and has stop elements for projecting into the rack teeth to force the clamp seats to displace only inwardly to be positioned in place. The securing seat further has slanting notches at its ends. A press rod provided with corresponding slanting notches is passed through the notches of the securing seat. By pressing the press rod, the securing seat is urged to displace rearwardly, causing the stop elements to disengage from the rack teeth. Due to the action of compression springs, the clamp seats are caused to instantly extend until they are restrained by the link. The clamping device of the invention requires few components, reduces costs and is compatible with various types of mobile phones.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
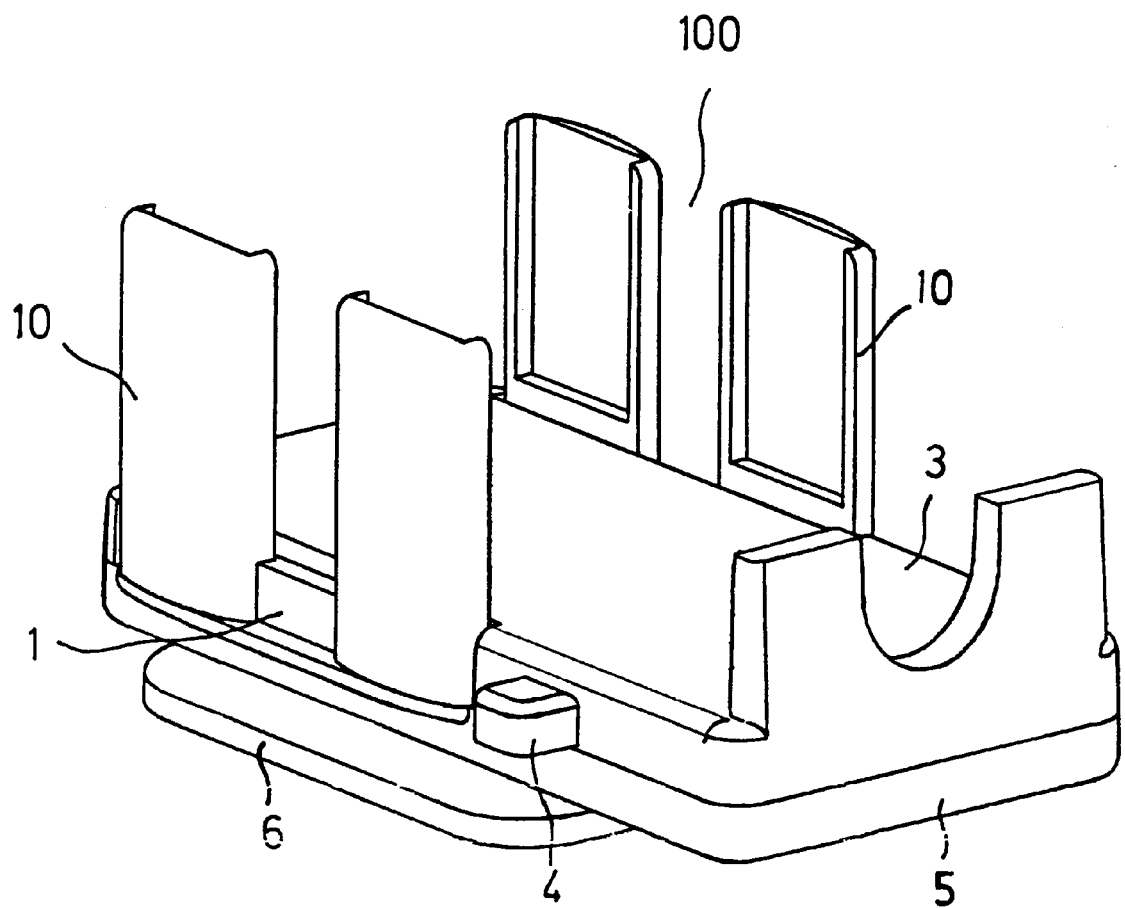
FIG. 1 is a perspective view of the present invention.
Figure 2:
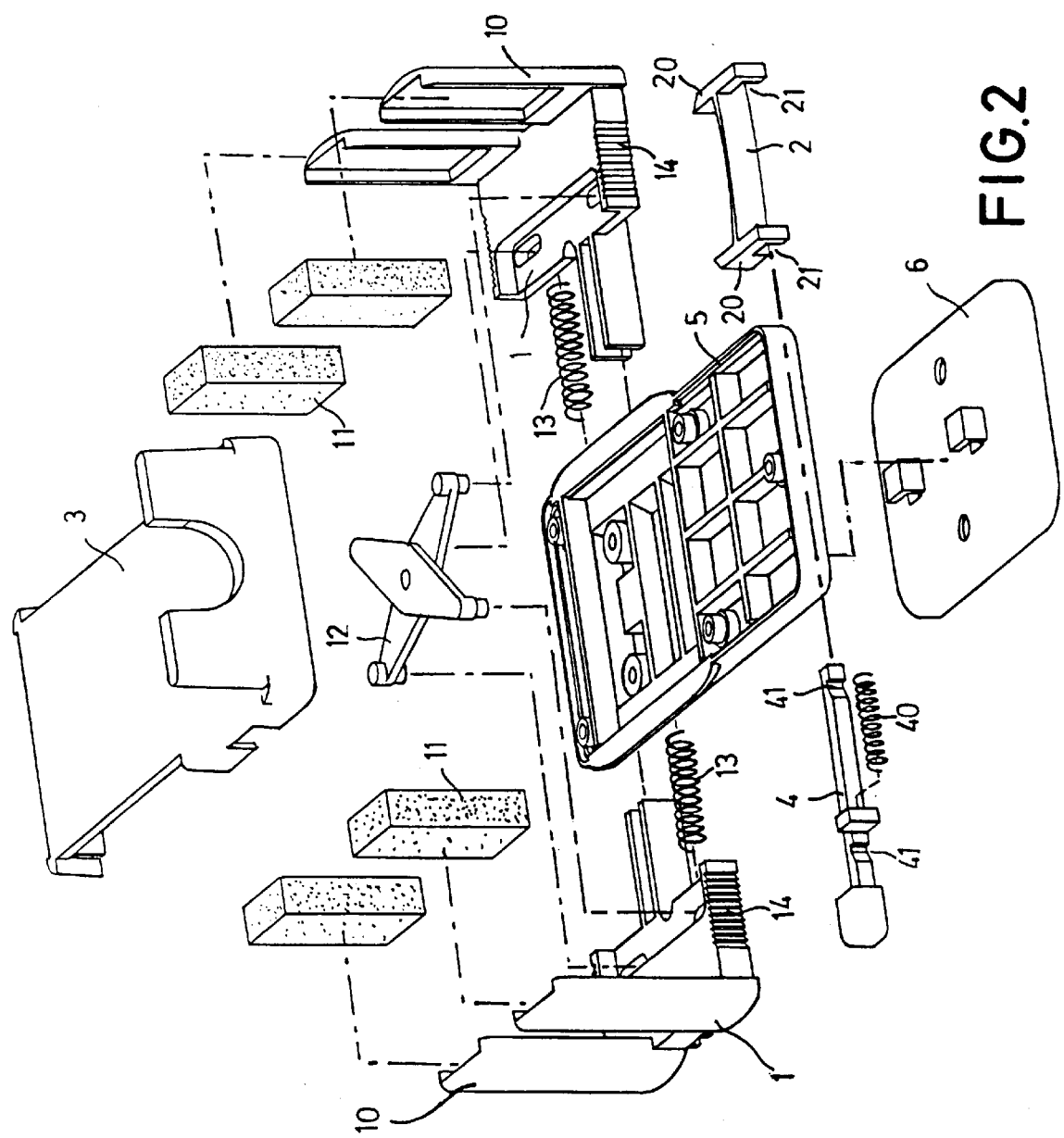
FIG. 2 is a perspective, exploded view of the present invention.
Figure 4:
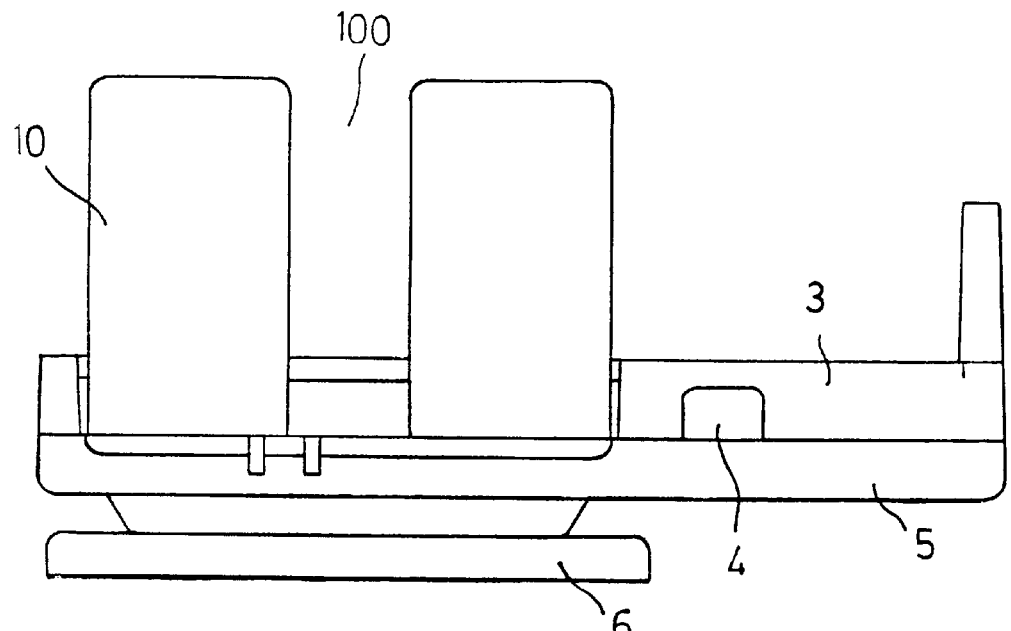
FIG. 4 is a view of the present invention.
Figure 3:
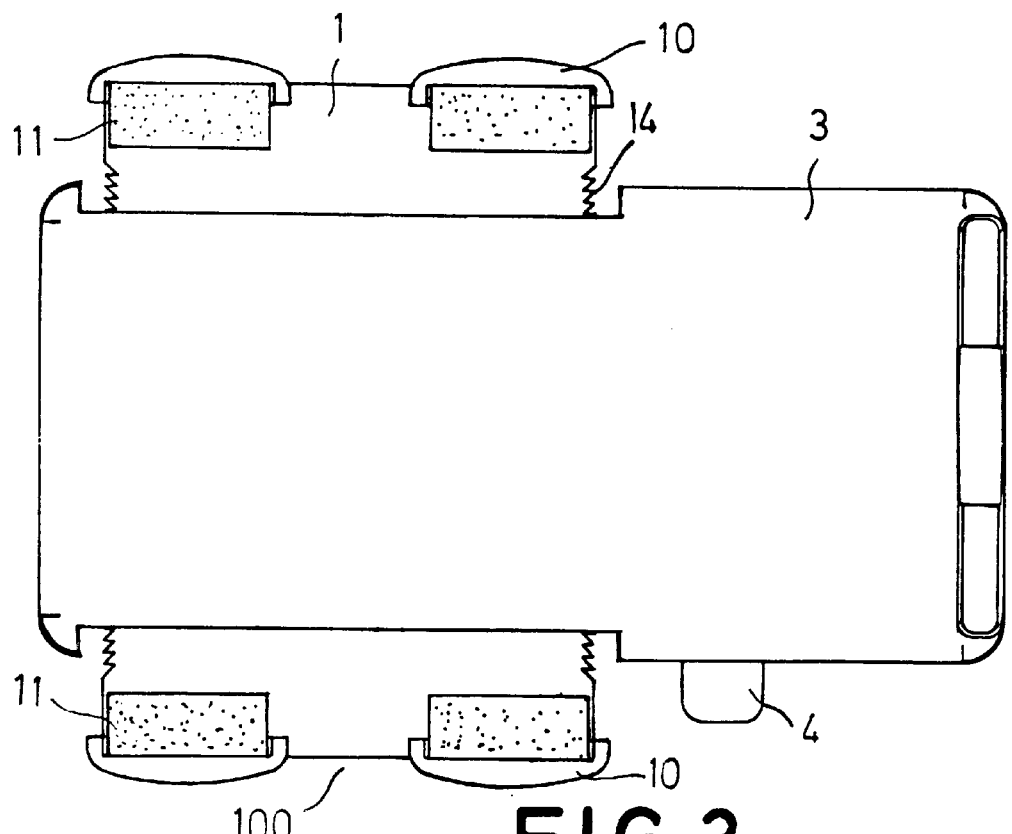
FIG. 3 is a bottom view of the present invention.
Figure 5:
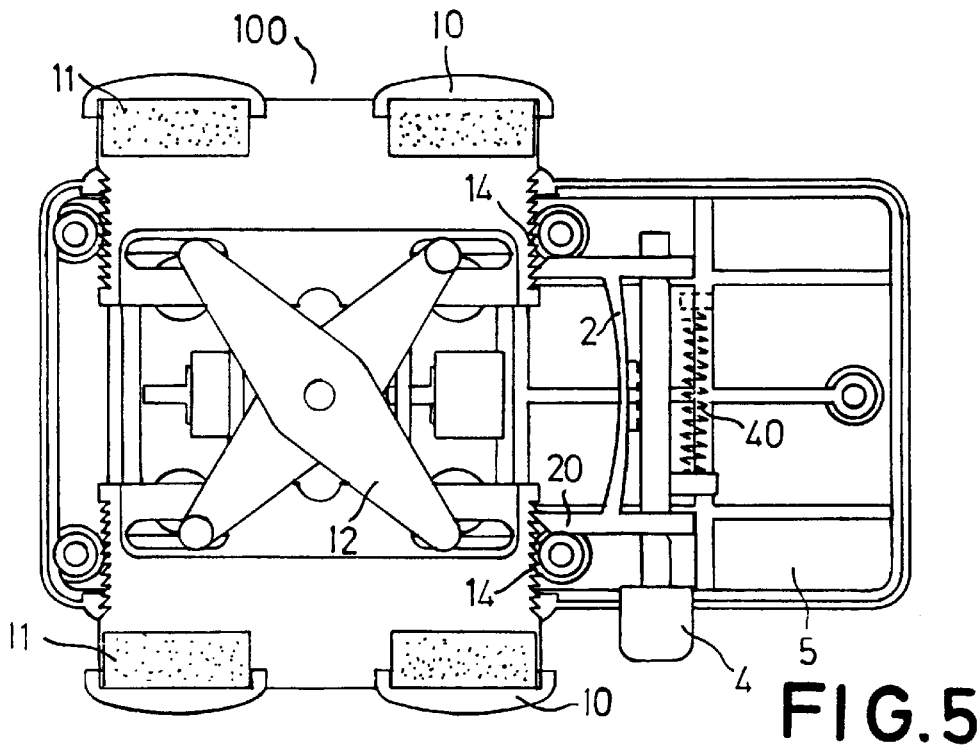
FIG. 5 is a sectional view of the present invention.
Figure 6:
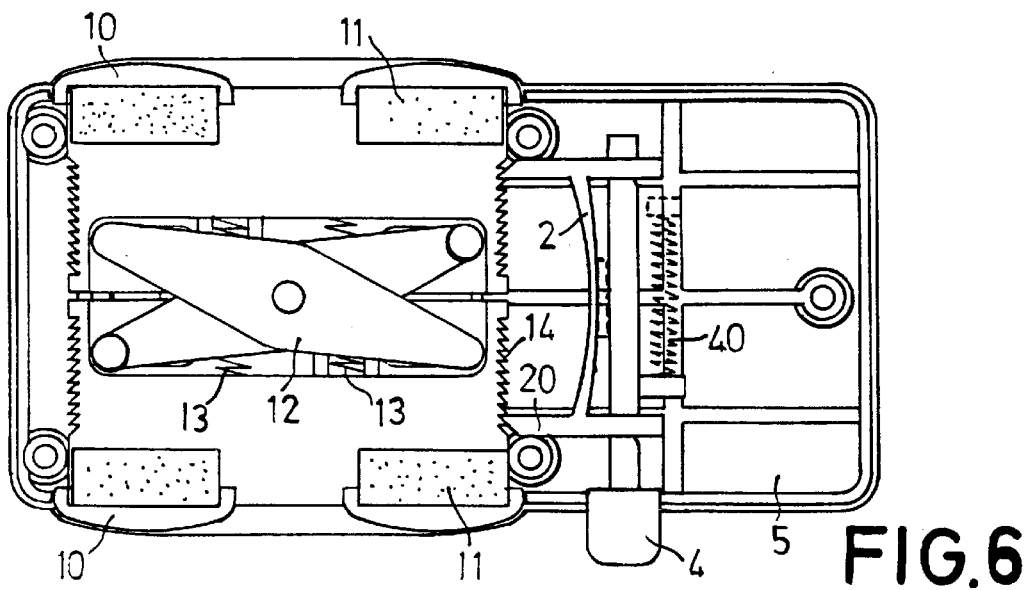
FIG. 6 is another sectional view of the present invention.

With reference to the drawings, the present invention essentially comprises two symmetrical clamp seats 1, a securing seat 2, a press rod 4 and an upper base 3 and a lower base 5. The clamp seats 1 are slidably fitted between the upper and lower bases 3, 5 such that they are symmetrically disposed on both sides of the upper and lower bases 3, 5 in the form of pawls. The clamp seats 1 are each provided with two side portions 10 which in turn are each provided with a rubber or foam pad 11 secured thereto. Each clamp seat 1 is pivotally linked to two ends of a fork-shaped link 12. Compression springs 13 are sandwiched between the clamp seats 1. Additionally, the lateral sides of each clamp seat are provided with a plurality of slanting, unidirectional rack teeth 14. The securing seat 2 is elastic and is provided on the upper base 3 adjacent to the rack teeth 14 at one side of the bases. The securing seat 2 has a plurality of stop elements 20 projecting into the rack teeth 14 to restrain the clamp seat 1, which may only press and displace inwardly and be positioned. The securing seat 2 is further provided with a slanting notch 21 at either end. The press rod 4, which urges against a spring 40, is passed through the notches 21. The press rod 4 is also provided with slanting notches 41 for matching the notches 21. A mounting base 6 may further be insertably secured to the lower base 5 in order to facilitate mounting the invention in the car.

In actual use, the mounting base 6 is securely placed at a suitable position in the car. The press rod 4 is then pushed so that it retracts inwardly. Due to the displacement of the notches 41 which urge against notches 21, bringing the stop elements 20 to displace rearwardly from the rack teeth 14, the securing action of the clamp seats 1 is released, and due to the action of the compression springs 13, they rapidly extend until restricted by the link 12. And when the press rod 4 is released, due to the action of the spring 40, the press rod 4 will automatically reset. As the urging action of the notches 41 disappears, the securing seat 2 will, due to its own elasticity, cause the stop elements 20 to displace forwardly and project into the rack teeth 14, thus positioning the clamp seats 1. When the driver has been seated, he/she may place the mobile phone between the clamp seats 1. As the lateral sides of the clamp seats 1 are configured to have rack teeth 14, the clamp seats 1 may be caused to displace inwardly and the stop elements 20 project unidirectionally to position the clamp seats 1. Hence, the inward displacement of the clamp seats 1 may be adjusted by pressing so as to clamp both sides of the mobile phone. Besides, the stop elements 20 enable instant positioning. And due to the link 12, the clamp seats 1 may perform synchronous actions and will not deviate from their proper positions to require adjustments. Furthermore, a clearance 100 is formed between the side portions of each clamp seat 1 to provide an adequate space for arrangement of electrical wires for connection to external power sources so as to match certain types of mobile phones in which sockets are provided at the sides. If the mobile phone is to be removed or carried for use, it is only necessary to press the press rod 4, causing the clamp seats to quickly extend. Such an arrangement allows the driver to pick up the mobile phone with only one hand, providing convenient and quick operation. Although the present invention has been illustrated and described with reference to the preferred embodiment thereof, it should be understood that it is in no way limited to the details of such embodiment but is capable of numerous modifications within the scope of the appended claims.

What is claimed is:

1. A clamping device for mobile phones, comprising:

an upper base and a lower bases; a clamp seat disposed on two opposite sides of said upper and lower bases in the form of pawls, each having a side portion provided with a pad, said clamp seats each having a lateral side provided with a plurality of slanting, unidirectional rack teeth; each clamp seat is respectively pivotally connected to ends of a fork-shaped link on said upper base; a plurality of compression springs disposed between said clamp seats, urging said clamp seats away from each other; an elastic securing seat disposed on said upper base adjacent to said rack teeth on said clamp seat, said securing seat having a plurality of stop elements, at least one stop element engaging the rack teeth on each of said clamping seats for restraining said clamp seats so as to be displaceable only inwardly toward each other, said securing seat further having first slanting notches at ends; a press rod passing through said notches, said press rod having second slanting notches at corresponding positions to said first slanting notches; and a press rod spring acting on the press rod whereby movement of the press rod against the press rod spring causes the plurality of stop elements to disengage from said rack teeth, thereby allowing the plurality of compression springs to move the clamping seats away from each other.

2. The clamping device as claimed in claim 1, further comprising a clearance formed between said side portions of each clamp seat to facilitate arrangement of electrical wires for connecting mobile phones.

\* \* \* \* \*